United States Patent [19]
Ilchuk

[11] Patent Number: 5,348,361
[45] Date of Patent: Sep. 20, 1994

[54] TREE MOVER

[76] Inventor: John Ilchuk, P.O. Box 852, Vermilion, Alberta, Canada, T0B 4M0

[21] Appl. No.: 60,061

[22] Filed: May 13, 1993

Related U.S. Application Data

[63] Continuation-in-part of Ser. No. 766,277, Sep. 27, 1991, Pat. No. 5,217,274.

[51] Int. Cl.$^5$ .............................................. B66C 3/16
[52] U.S. Cl. .................................. 294/68.23; 294/88; 414/625; 37/901
[58] Field of Search ................. 294/50, 50.5, 68.23, 294/88; 414/624, 625; 37/183 R, 186, 187, 188, 901; 172/233; 56/400.08, 400.1

[56] References Cited

U.S. PATENT DOCUMENTS

| 541,841 | 7/1895 | Doyle | 294/50.5 X |
|---|---|---|---|
| 851,733 | 4/1907 | Desy | 294/50.5 X |
| 2,007,704 | 7/1935 | Botten | 37/186 |
| 2,499,433 | 3/1950 | Waite et al. | |
| 2,889,643 | 6/1959 | Chatrenet | |
| 2,890,806 | 12/1971 | Pilch | 294/68.23 X |
| 3,627,371 | 12/1971 | Billings | 37/187 X |
| 3,641,689 | 2/1972 | Billings | 37/186 |
| 3,772,806 | 2/1973 | Meadows | 37/187 X |
| 3,977,099 | 8/1976 | Stewart | 37/2 R |
| 4,005,894 | 2/1977 | Tucek | 294/88 |
| 4,071,155 | 1/1978 | Hart et al. | 37/187 X |
| 4,497,608 | 2/1985 | Sheppard et al. | 414/624 X |
| 4,573,862 | 3/1986 | Anderson | 294/88 X |
| 4,602,444 | 7/1986 | Endo | 37/2 R |
| 4,676,013 | 6/1987 | Endo | 37/2 R |
| 5,217,274 | 6/1993 | Ilchuck | 294/88 X |

FOREIGN PATENT DOCUMENTS

| 1035204 | 7/1978 | Canada | 111/2 |
|---|---|---|---|
| 204459 | 11/1983 | Fed. Rep. of Germany | 294/68.23 |
| 3245673 | 1/1984 | Fed. Rep. of Germany | 294/68.23 |
| 1366036 | 6/1964 | France | 294/68.23 |
| 1377486 | 9/1964 | France | 294/68.23 |
| 2064473 | 6/1981 | United Kingdom | 37/901 |

Primary Examiner—Dean J. Kramer
Attorney, Agent, or Firm—Stevens, Davis, Miller & Mosher

[57] ABSTRACT

This invention relates to a tree mover for relocating small trees. The tree mover is designed to dig a hole to receive a tree having a root ball, dig up a tree and deposit a tree in a hole. The tree mover comprises loader buckets having concave inner surfaces pivoted between an open position for digging and a closed position for lifting. Pusher blades are mounted so as to be closely spaced from said inner surfaces and to be movable between a raised position and a lowered position. These pusher blades enable the integrity of a root ball of a tree to be retained. They also may be used to clean dirt from the surface of the bucket.

4 Claims, 5 Drawing Sheets

TREE MOVER

RELATED APPLICATION

This is a continuation in part of Application Ser. No. 07/766,277 filed Sep. 27, 1991 and entitled Tree Mover now U.S. Pat. No. 5,217,274.

OBJECTS OF THE INVENTION

This invention relates to a tree mover for relocating small trees.

An object of this invention is to provide a tree mover including buckets which are adapted to dig a hole to receive a tree, dig up a tree and unload such tree, with the root ball, in the hole.

A further object is to provide a tree mover with a simple rugged mechanism.

A further object of this invention in its preferred embodiment is to provide a tree mover, the working parts of which can readily be disassembled for repair.

A further object of this invention in its preferred embodiment is to provide a tree mover including provision against damage to its mechanism if an obstruction is encountered.

Another object of this invention is to make provision for retaining the integrity of the root ball while it is being unloaded onto a hole.

It is also an object of this invention to control the tree while it is being unloaded so that the tree will be straight.

It is another object of this invention to enable soil to be cleaned from the buckets.

BRIEF DESCRIPTION OF THE INVENTION

A tree mover is provided comprising a supporting frame, a pair of loader buckets having concave inner surfaces mounted on said frame for pivotal movement about substantially horizontal axes between an open position for digging and a closed position for lifting, means for pivotally moving said loader buckets about said horizontal axes, a pusher blade pivotally mounted on each of said buckets so as to be movable between a raised position and a lowered position with the pusher blade being closely spaced from the inner surface of the bucket throughout such movement and means for moving said pusher blade.

This is particularly advantageous for maintaining the integrity of the root ball while a tree is being relocated. As the buckets are lowered to deposit the tree in a hole which has been dug in a new location, the buckets are opened. At the same time the buckets are lifted. Also at the same time, the pusher blades are biased from a raised position towards a lower position to support and follow the root ball to prevent the root ball from breaking apart.

The pusher blades also function to clean off any dirt that adheres to the inner surface of the buckets after digging or planting a tree.

BRIEF DESCRIPTION OF THE DRAWINGS

In the drawings which illustrate the preferred embodiment of this invention.

DETAILED DESCRIPTION OF THE DRAWINGS

Figure 1:
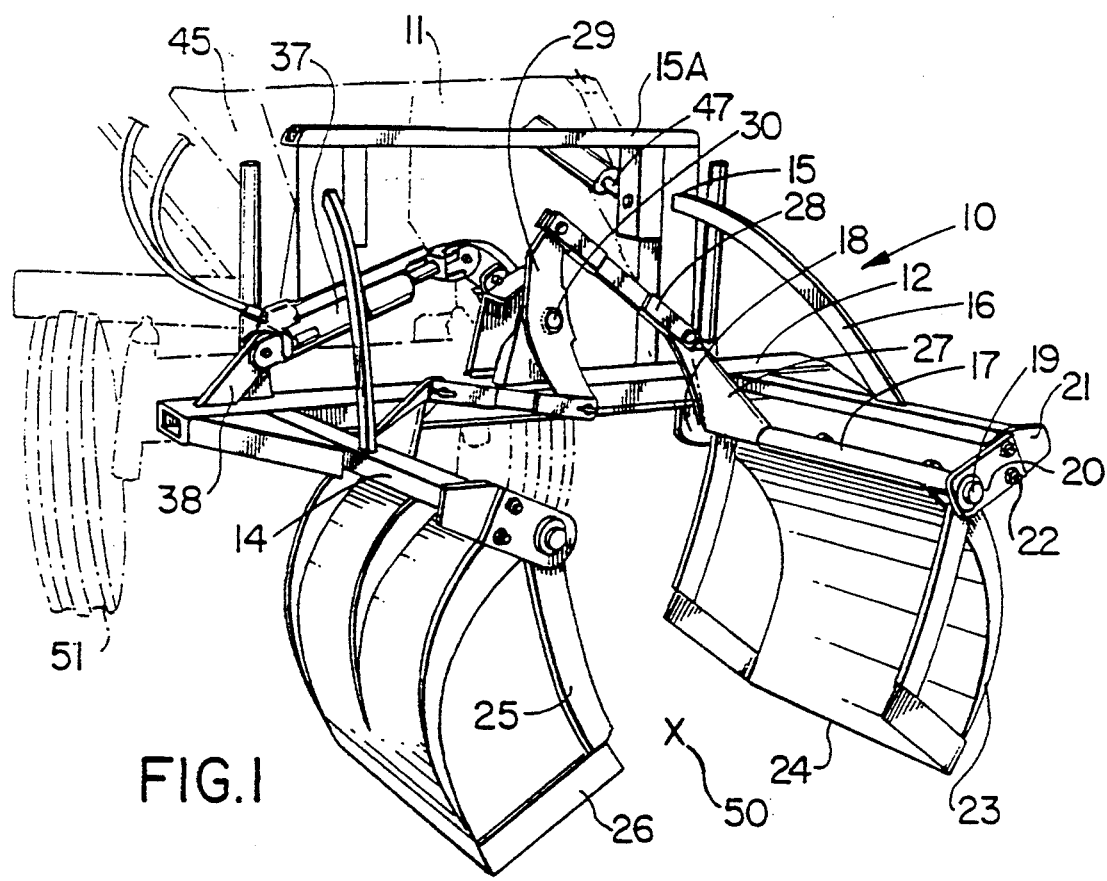
FIG. 1 is a front perspective view of a tree mover showing the buckets in open position.

FIGS. 1 to 4 of the drawings illustrate a tree mover generally indicated by the number 10 mounted at the front of a tractor 11. The tree mover comprises a generally C-shaped frame 12 consisting of transverse frame member 13 at each end of which is connected longitudinal frame members 14. At the rearward end of frame 12 there are upright frame members 15, the tops of which are joined by crosspiece 15A. Braces 16 are connected between upright frame members 15 and longitudinal frame members 14.

Shafts 17 have bearings 18 located on the underside of transverse member 13 and bearings 19 mounted on linkage arms 20 which are joined to plates 21 at the ends of longitudinal frame members 14 by bolts 22. Buckets 23 are mounted on shafts 17 and have cutting edges 24 at their bottoms. Buckets 23 include also lateral brace members 25 and 26. Buckets 23 can easily be removed for repair by removing bolts 22, and linkage arms 20, together with bearing 19, and sliding shafts 17 forward out of bearings 18.

Each of shafts 17 has a crank arm 27 at its forward end. Links 28 joins each of crank arms 17 to an arm of a double crank 29 so that rotation of double crank 29 in one direction biases loader buckets 23 towards each other to a closed position and rotation of the double crank 29 in an opposite direction biases the loader buckets away from each other to an open position.

Figure 4:
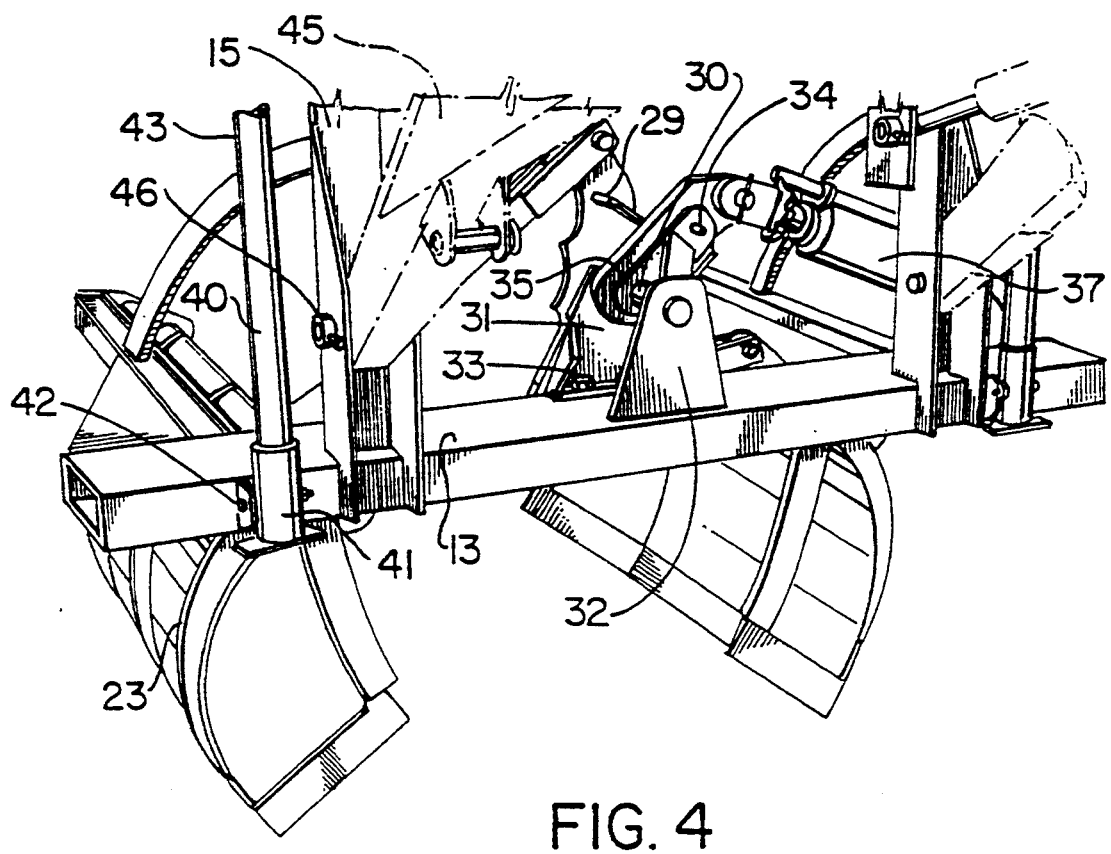
FIG. 4 is a back perspective view illustrating part of the tree mover shown in FIGS. 1 to 3.
Figure 5:
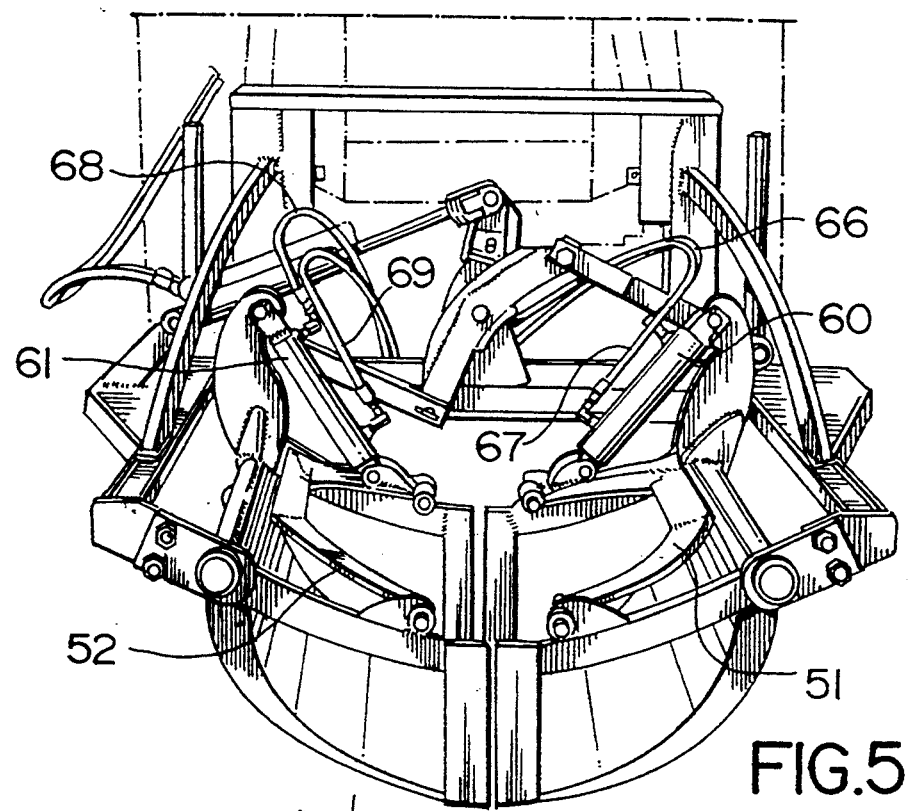
FIG. 5 is a front perspective view of an improved tree mover including pusher blades and showing the buckets in closed position.

Double crank 29 is mounted on crank shaft 30 which as best shown in FIG. 4, is supported by brackets 31 and 32. Bracket 31 is L-shaped and bolted by bolts 33 to transverse frame 13 so that the lever mechanism can be disassembled by removing bolts 33.

Link 34 is rigidly mounted, such as by welding, to crank shaft 30. Link 35 is loosely mounted on crank shaft 30. Shear pin 36 connects links 34 and 35. Double acting hydraulic cylinder 37 extends between link 35 and a supporting bracket 38 on frame member 13. Hydraulic cylinder 37 therefore acts through links 34 and 35 and double crank 29 to open and close buckets 23. Shear pin 36 protects the mechanism in the event of an obstruction such as a boulder.

A storage stand is provided by upright members 40 slidable in sleeves 41 which are joined to transverse frame 13. Pins 42 engage holes 43 to hold member 40 in an appropriate position for storage. The tree mover 10 is linked to tractor 11 by connecting members 45 which extend upwardly and rearwardly from the lower parts of upright members 15 to which they are pivotally joined by pins 46. Members 45 are secured to the tractor at their other ends. A double acting hydraulic cylinder 47 is connected between an upper part of upright member 15 and the tractor so that actuating cylinder 47 is connected between an upper part of upright member 15 and the tractor so that actuating cylinder 47 causes buckets 23 to be raised or lowered between a position in which buckets 23 are above ground level and position in which they are below ground level. Connecting members 45 have bracing members 48, because of the stress to which they will be subjected by the action described below.

Figure 2:
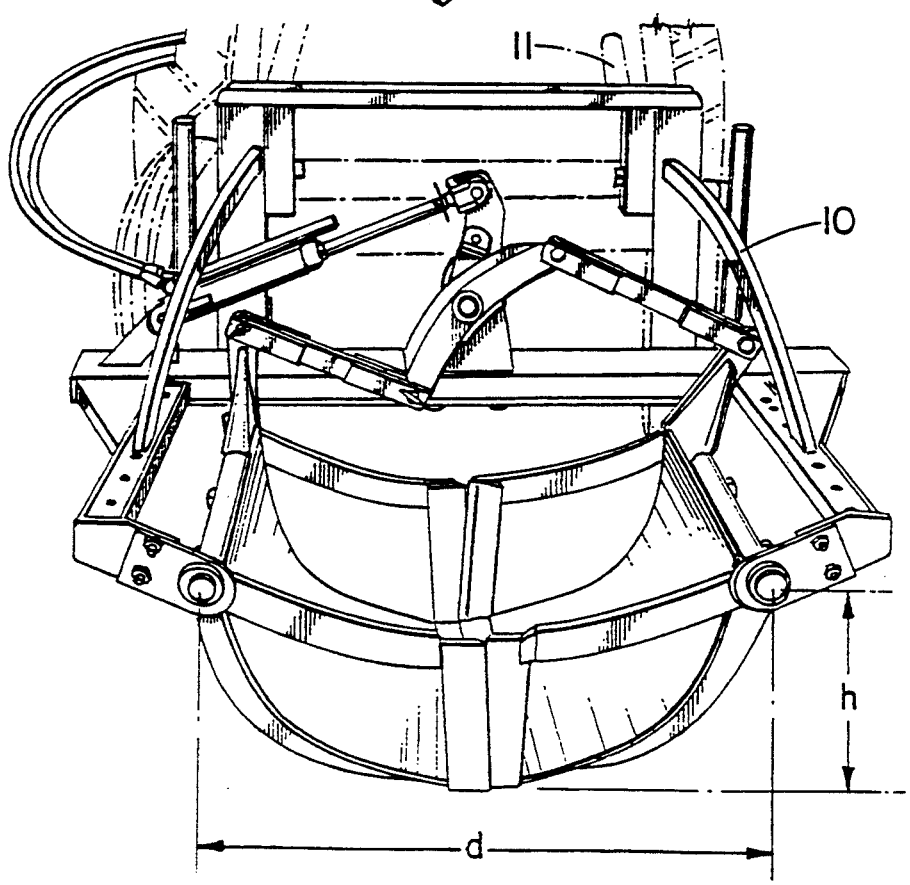
FIG. 2 is a front perspective view of a tree mover showing the buckets in closed position.
Figure 3:
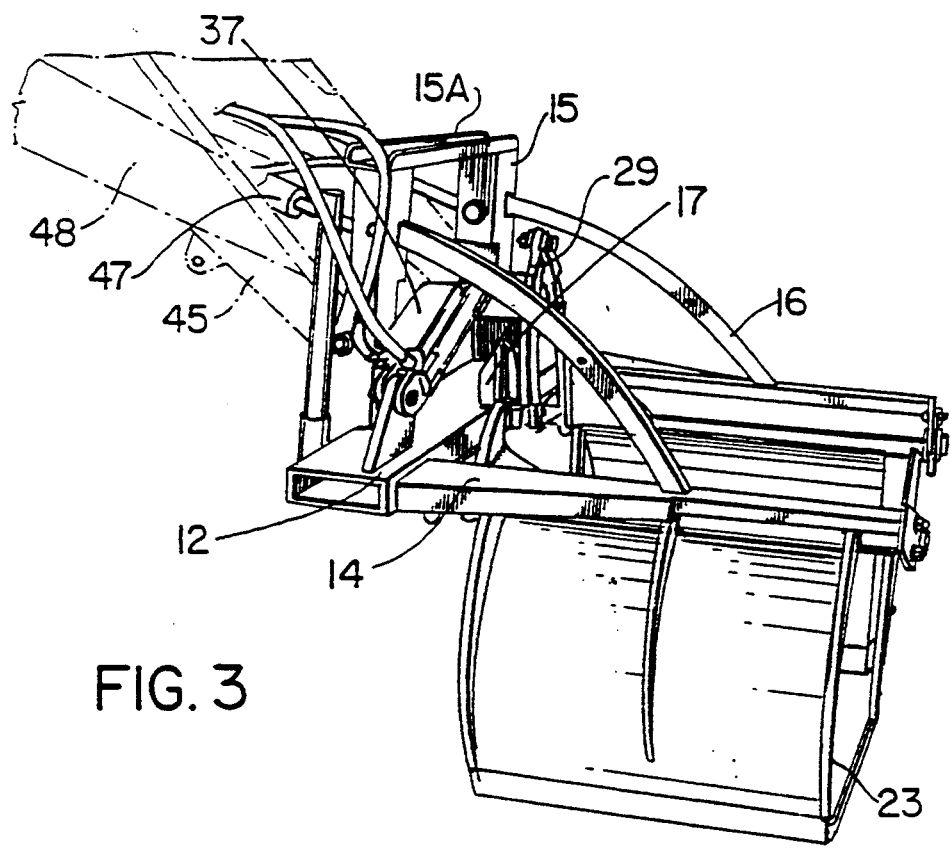
FIG. 3 is a side perspective view of a tree mover illustrated in FIGS. 1 and 2.

To operate the tree mover it is positioned with the buckets 23 in an open position as shown in FIG. 1, each to one side of the spot marked X and indicated by the numeral 50 where a tree is to be planted. Pressure is exerted downwardly by hydraulic loader cylinder 47 lifting most of the weight off the front wheels 51 of the tractor. Hydraulic cylinder 37 is then actuated to move the buckets 23 to the closed position of FIG. 2. Under normal conditions it should be possible to cut a hole about 18" deep by 36" square at the top where dimension h in FIG. 2 is 18" and dimension d is 36".

The soil in buckets 23 is removed to a remote location. If, however, it is desired to save some of the top soil to fill in holes and air spaces around the tree after the tree is set in the hole, successive cuts are made. The first cut may be 8" to 10" deep to remove and retain the top soil. The depth of cut is regulated by the downward pressure applied by the loader cylinder 47.

The tree mover is located in the position of FIG. 1 with the tree at location X. Downward pressure is exerted and the tree with its adjacent roots and surrounding earth is scooped up. Sometimes it is necessary to rock the cutting blades backwards and forwards as downward pressure is applied and the blades 24 of the buckets 23 are brought together. This may be required to cut through thick roots, hard clay and gumbo soil.

The tree is then positioned over the hole that has previously been dug. It is lowered into the hole and levelled by controlling the bucket cylinder. The blades are then opened and at the same time lifted to remove them.

FIGS. 5 to 8 illustrate an improvement to the tree mover illustrated in FIGS. 1 to 4 in which pusher blades are provided to assist in retaining the integrity of the root ball while a tree is being unloaded into a hole. The pusher blades also will help to keep the tree straight. Another function is to enable soil adhering to the buckets to be removed. The structure and function of the tree mover in FIGS. 5 to 8 is the same as previously described with respect to FIGS. 1 to 4. Therefore in the description that follows repetition of the description of common parts will be avoided. The same numerals will be used for similar parts.

In FIGS. 5 to 8, generally U-shaped pusher blades 51 and 52 are provided. Each includes a blade portion 53 extending substantially parallel to, but slightly spaced from, the concavely curved inner surface 54 of bucket 23, and supporting arms 55 and 56 at each end of blade portion 53.

Figure 6:
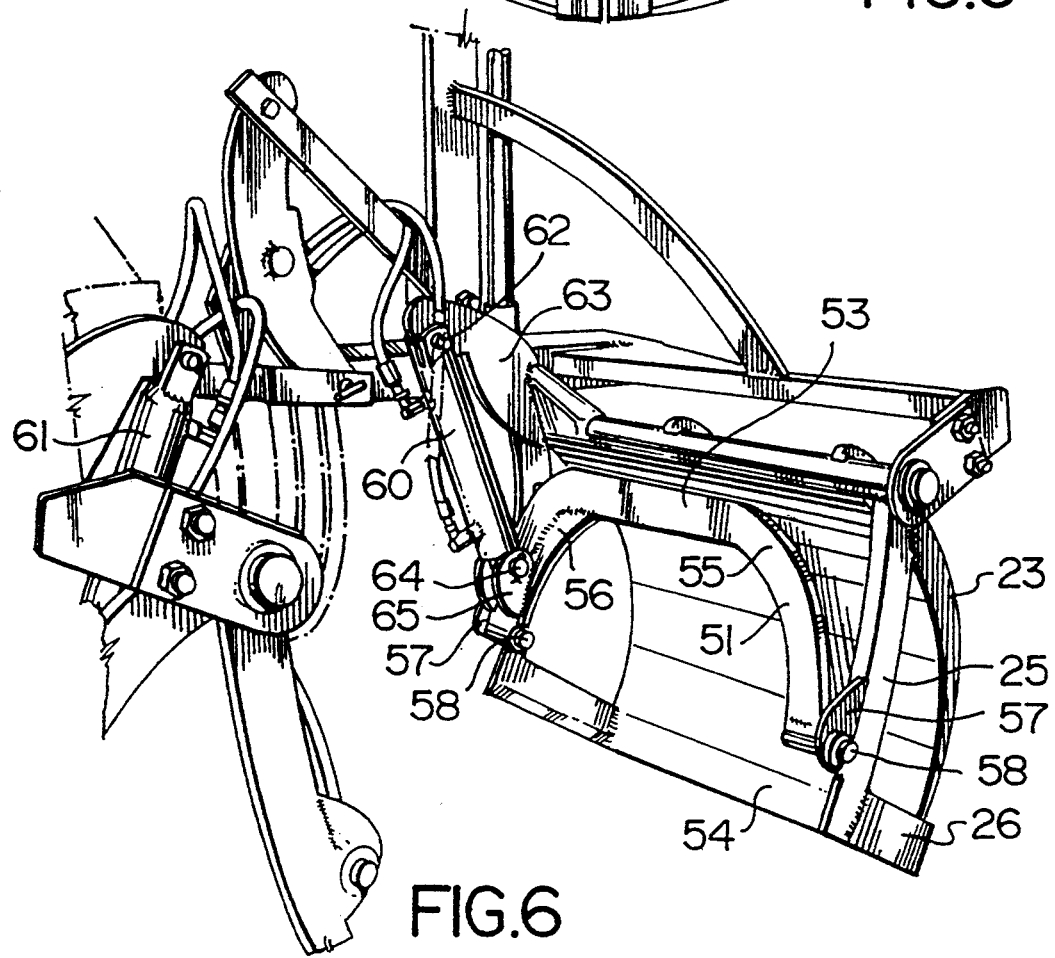
FIG. 6 is a detailed front perspective view of the improved tree mover of FIG. 5 in which the pusher blades are in a raised position and the buckets are in open position.
Figure 7:
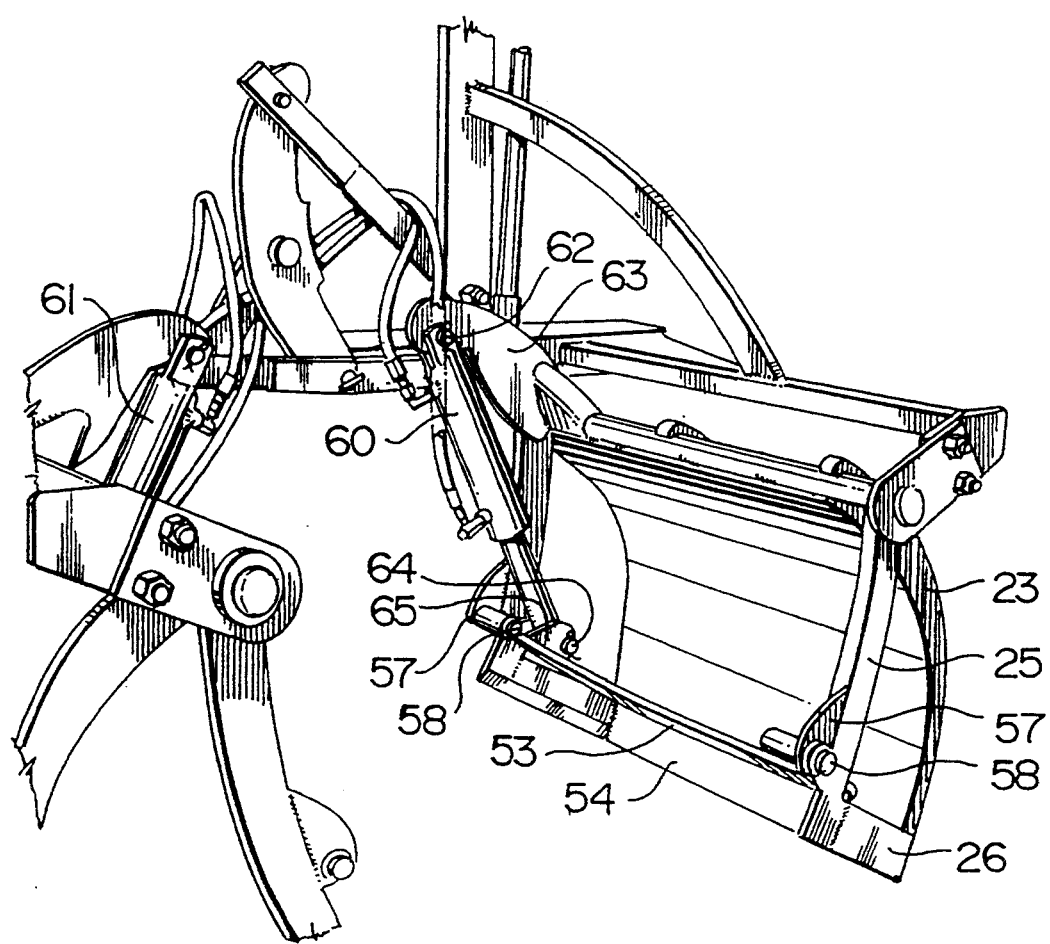
FIG. 7 is a detailed perspective view of the improved tree mover of FIG. 5 in which the pusher blades are in a lowered position and the buckets are in open position.
Figure 8:
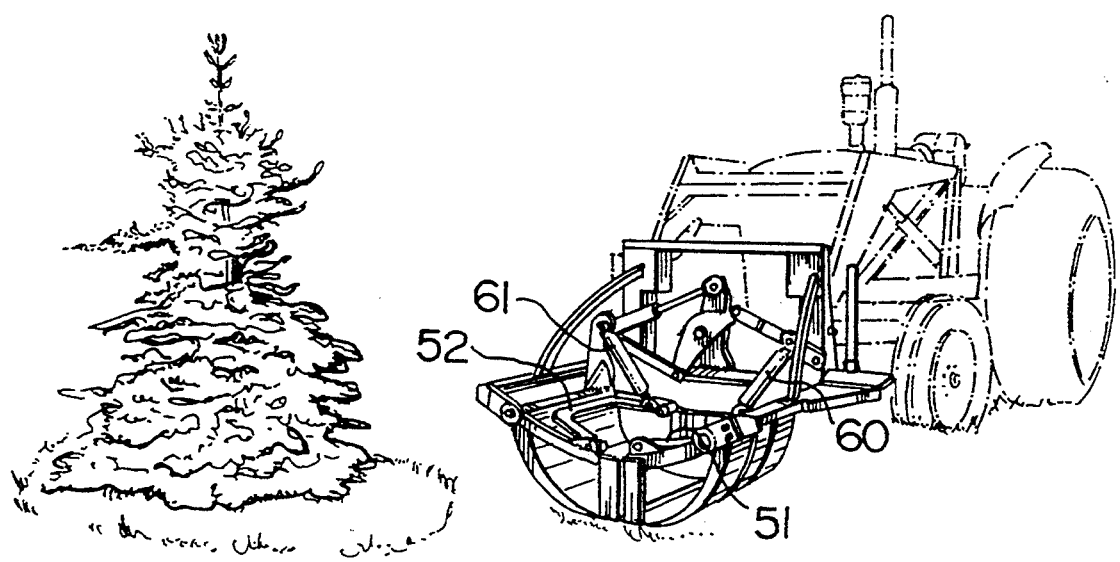
FIG. 8 is a front perspective view of a tractor, upon which the improved tree mover of FIG. 5 has been mounted. The pusher blades are in a raised position and the buckets are closed.

Brackets 57 are located on the brace members 25 of bucket 23 to give a mounting for pivot pins 58 which are the free ends of supporting arms 55 and 56, so that pusher blades 51 and 52 may be pivoted between the raised position shown in FIG. 6 and the lowered position illustrated in FIG. 7. In the raised position the blade is adjacent to the top of the inner surface 54 of bucket 23 and in the lowered position is adjacent to the bottom of surface 54.

Pivot pins 58 are located so that blades 53 are slightly spaced from the inner surface 54 of bucket 23 throughout the movement between raised and lowered position.

Hydraulic cylinder 60 controls blade 51 and hydraulic cylinder 61 controls blade 52. Hydraulic cylinder 60 is pivotally mounted by pivot pin 62 on upper bracket 63, which is in turn welded to bucket 23. Pivot pin 64 connects hydraulic cylinder 60 to lower bracket 65, which is mounted on supporting arm 56 of pusher blade 51. Hydraulic cylinder 61 is similarly mounted to control blade 52. When hydraulic cylinders 60 and 61 are extended, blades 51 and 52 will be in lowered position and when these cylinders are retracted blades 51 and 52 will be biased to raised position.

Hydraulic lines 66 and 67 provide hydraulic fluid to double acting hydraulic cylinder 60 and separately controlled lines 68 and 69 provide hydraulic fluid to hydraulic cylinder 61. Therefore hydraulic cylinders 60 and 61 can be actuated together to raise or lower pusher blades 51 and 52 in unison. Alternatively hydraulic cylinders 60 and 61 can be actuated separately, which is useful for straightening out a tree that is tilting to one side.

As mounting bracket 63 is on bucket 23 and pusher blade 51 is pivotally mounted on brace 25 forming part of bucket 23, the position of pusher blade 51 remains constant in relation to bucket 23 as bucket 23 is opened and closed.

Description of Operation

When digging a hole for a tree to be planted, the pusher blades 51 and 52 will be in a raised position as shown in FIG. 6. Sometimes dirt will stick to the buckets. If so, pusher blades 51 and 52 can be pivoted to the lowered position shown in FIG. 7, so as to sweep the dirt from the interior surface 54 of bucket 23. If there is dirt on only one bucket one of blades 51 and 52 can be actuated.

When it is desired to dig up a tree, blades 51 and 52 will start in a raised position. The buckets will be open as shown in FIG. 6 and will be on each side of the tree to be dug up. If necessary, the weight of the tractor may be used to drive the buckets into the ground to scoop up the tree including the root ball. The buckets are pivoted to a closed position and the tree is lifted and transported to its new position where a hole has already been dug.

It is desired to maintain the integrity of the root ball as the tree is deposited in its new location. The root ball will sometimes break apart using a tree mover as described in FIGS. 1 to 4. Therefore, in accordance with the improvement illustrated in FIGS. 5-8, the tree is replanted in the previously dug hole by lowering the buckets holding the tree into the hole. The buckets are then carefully lifted and at the same time the buckets are rotated to an open position. At the same time also the pusher blades 51 and 52 are pivoted down towards a lowered position to support and follow the root ball so that the root ball does not break apart.

If the tree appears to be crooked during the unloading operation then the pusher blade can moved down faster on the high side than on the low side (that is to say the side to which the tree is inclined) to straighten the tree.

I claim:

1. A tree mover comprising a supporting frame, a pair of loader buckets having concave inner surfaces mounted on said frame for pivotal movement about substantially horizontal axes between an open position for digging and closed position for lifting, means for pivotally moving said loader buckets about said horizontal axes, a generally U-shaped pusher blade, including a blade portion and supporting arms at each end of the blade portion, pivotally mounted on each of said buckets so as to be movable between a raised position and a lowered position with the pusher blade being closely spaced from the inner surface of the bucket throughout such movement, a first bracket mounted on one of said supporting arms and a second bracket mounted on a loader bucket and in which a double acting hydraulic cylinder is pivotally connected to the first and second brackets to bias the pusher blade between its raised and lowered position and means for moving said pusher blade.

2. A tree mover as in claim 1 in which the pusher blades mounted on each of the buckets are independently controlled.

3. A tree mover comprising a generally C-shaped supporting frame with braced upright frame members at its rearward end, said supporting frame being adapted for attachment at its rear end to the front of a tractor, a pair of spaced forwardly extending shafts pivotally mounted on said frame, a loader bucket having a concave inwardly facing surface and having a cutting edge at its bottom mounted at its upper end on each of said shafts for rotation about a substantially horizontal axis, a crank arm connected to each of said shafts, a link joining each of said crank arms to an arm of a double crank which is mounted for rotation about a substantially horizontal axis so that rotation of the double crank in one direction biases the loader buckets away from each other in unison to an open position, a double acting hydraulic cylinder for rotating said double crank in one direction or the opposite direction and means for raising said loader buckets and lowering them below ground level to lift most of the weight of the front of the tractor off the ground so as to impart downward pressure for digging from the weight of said tractor forcing said cutting edges into the ground, and a pusher blade mounted to sweep said concave inwardly facing surface, means for actuating said pusher blade, said pusher blade having a first bracket and a second bracket and hydraulic means pivotally connected to the first and second brackets to provide said means for actuating said pusher blade.

4. A tree mover as in claim 3 in which each pusher blade is separately controlled.

* * * * *